United States Patent
Engel et al.

(10) Patent No.: US 9,361,074 B2
(45) Date of Patent: Jun. 7, 2016

(54) METHOD FOR CREATING A USER INTERFACE

(71) Applicant: Keysight Technologies, Inc., Minneaoplis, MN (US)

(72) Inventors: Glenn R. Engel, Everett, WA (US); Jonathan Helfman, Santa Clara, CA (US)

(73) Assignee: Keysight Technologies, Inc., Santa Rosa, CA (US)

( * ) Notice: Subject to any disclaimer, the term of this patent is extended or adjusted under 35 U.S.C. 154(b) by 180 days.

(21) Appl. No.: 14/155,131

(22) Filed: Jan. 14, 2014

(65) Prior Publication Data

US 2014/0282133 A1 Sep. 18, 2014

Related U.S. Application Data

(60) Provisional application No. 61/793,975, filed on Mar. 15, 2013.

(51) Int. Cl.
*G06F 13/00* (2006.01)
*G06F 15/00* (2006.01)
*G06F 9/44* (2006.01)

(52) U.S. Cl.
CPC .......................................... *G06F 8/38* (2013.01)

(58) Field of Classification Search
CPC .... G06F 17/30899; G06F 3/0484; G06F 8/38
USPC .......... 715/740, 761–765, 751, 733, 781, 783
See application file for complete search history.

(56) References Cited

U.S. PATENT DOCUMENTS

| | | | |
|---|---|---|---|
| 7,134,085 B2 * | 11/2006 | Austin | 715/763 |
| 2003/0132964 A1 * | 7/2003 | Santori et al. | 345/763 |
| 2007/0150821 A1 * | 6/2007 | Thunemann et al. | 715/762 |
| 2010/0114857 A1 * | 5/2010 | Edwards et al. | 707/709 |
| 2013/0290858 A1 * | 10/2013 | Beveridge | 715/740 |
| 2015/0020036 A1 * | 1/2015 | Kim et al. | 715/863 |

* cited by examiner

*Primary Examiner* — Kevin Nguyen

(57) ABSTRACT

A method of operating a data processing system having a control screen to provide control of a program is disclosed. First and second program graphical user interfaces (GUIs) and a runtime library are provided. The first program GUI includes a first GUI description and a first method for operating on data input to or data output from that the first program GUI. The second program GUI includes a second GUI description and a second method for operating on data input to or data output from that the second program GUI. The runtime library includes the first and second method. The data processing system combines the first GUI description and the second GUI description to provide a compound GUI without recompiling the runtime library.

18 Claims, 4 Drawing Sheets

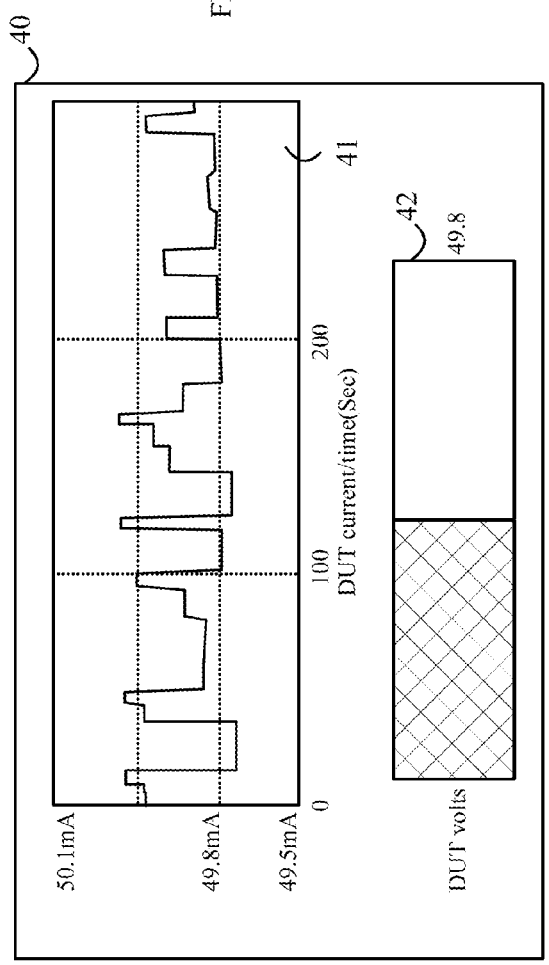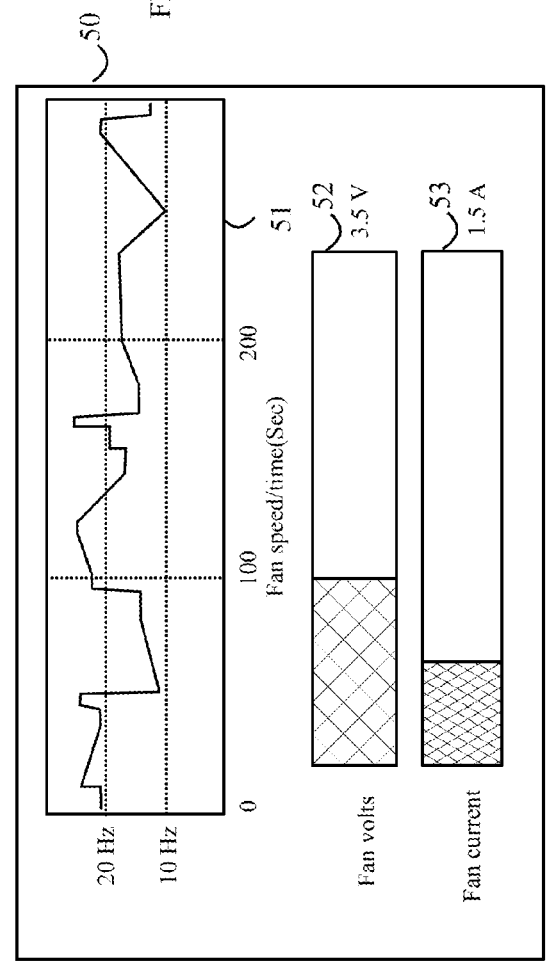

METHOD FOR CREATING A USER INTERFACE

CROSS-REFERENCE TO RELATED PATENT APPLICATIONS

This application is a conversion of, and claims priority therefrom, of U.S. Provisional Patent Application 61/793,975 filed on Mar. 15, 2013, said patent application being incorporated by reference herein.

BACKGROUND

Computer-based control systems are used in a wide variety of situations. For example, modern measurement instruments are often constructed using general purpose computers to control various input, output, and computational modules that collect, process and display the relevant information to a user. The interface between the user and the instrument is typically some form of graphical user interface that displays the data and allows the user to input commands via a keyboard and/or pointing device that specify the inputs and desired outputs.

In some "synthetic" instruments, the instrument includes physical parts that are connected to a controlling data processing system via networks that can include the Internet and wireless links. The actual control program could be running on a conventional data processing system at some remote location or on any of a variety of handheld devices such as smart phones, tablets, etc. Each device has different display limitations that are imposed by the computational capacity of the device and the size of its display screen. Hence, the task of providing a graphical user interface for each possible controlling device presents significant challenges.

Graphical user interfaces (GUIs) for controlling computer programs, real-world mechanical or electrical systems, or instruments are typically created using a commercially supplied programming environment. The programming environment provides a list of available components, and the programmer selects components from this list and arranges the components in question on a form to define the layout of the graphical user interface. The user then writes code that specifies the interactions of the components and the source of input data to the program. Finally, the program is compiled to an executable that is loaded onto the host computer. Once the executable is created, changes to the graphical user interface that have not been anticipated by the program developer must typically be made by returning to the programming environment, making the changes in the source code and layout files, and then recompiling the program.

A new user interface is typically created by starting from scratch using the programming environment or by copying the source code from a previous design and modifying the code for the new application. This process is tedious, time consuming, and error prone. In addition, the process requires a programmer who is trained both in the programming environment and the relevant computer languages. The end user of the instrument or program typically lacks such skills. Hence, the user of the graphical user interface must typically collaborate with a programmer if the user wishes to create a new graphical user interface. In addition, there is a significant lag time between the conceptualization of a new graphical user interface and its implementation in the form that the end user can utilize. Hence there is resistance to creating new graphical user interfaces or modifying existing graphical user interfaces.

SUMMARY

The present invention includes a method of operating a data processing system having a control screen to provide control of a program. First and second program GUIs and a runtime library are provided. The first program GUI includes a first GUI description and a first method for operating on data input to or data output from the first program GUI. The second program GUI includes a second GUI description and a second method for operating on data input to or data output from that the second program GUI. The runtime library includes the first and second method. The data processing system combines the first GUI description and the second GUI description to provide a compound GUI without recompiling the runtime library.

In one aspect of the invention, the first GUI has signal inputs or provides outputs from/to a source external to the data processing system and the compound GUI also has the signal inputs and/or provides those outputs.

In another aspect of the invention, the data processing system combines the first GUI description and the second GUI description by displaying the first GUI and the second GUI and responds to a user selecting the first GUI and dragging the first GUI into the second GUI.

In yet another aspect of the invention, the second GUI occupies a first area on the control screen and the data processing system automatically resizes the first GUI such that the first GUI and second GUI occupy the first area.

In a still further aspect of the invention, the first GUI includes a widget characterized by a widget display area, and the widget automatically resizes the widget display area in response to the combining of the first GUI description and the second GUI description.

BRIEF DESCRIPTION OF THE DRAWINGS

FIGS. 1 and 2 illustrate two GUIs that have already been constructed for viewing and/or controlling an instrument.

DETAILED DESCRIPTION OF EXEMPLARY EMBODIMENTS OF THE INVENTION

Figure 3:
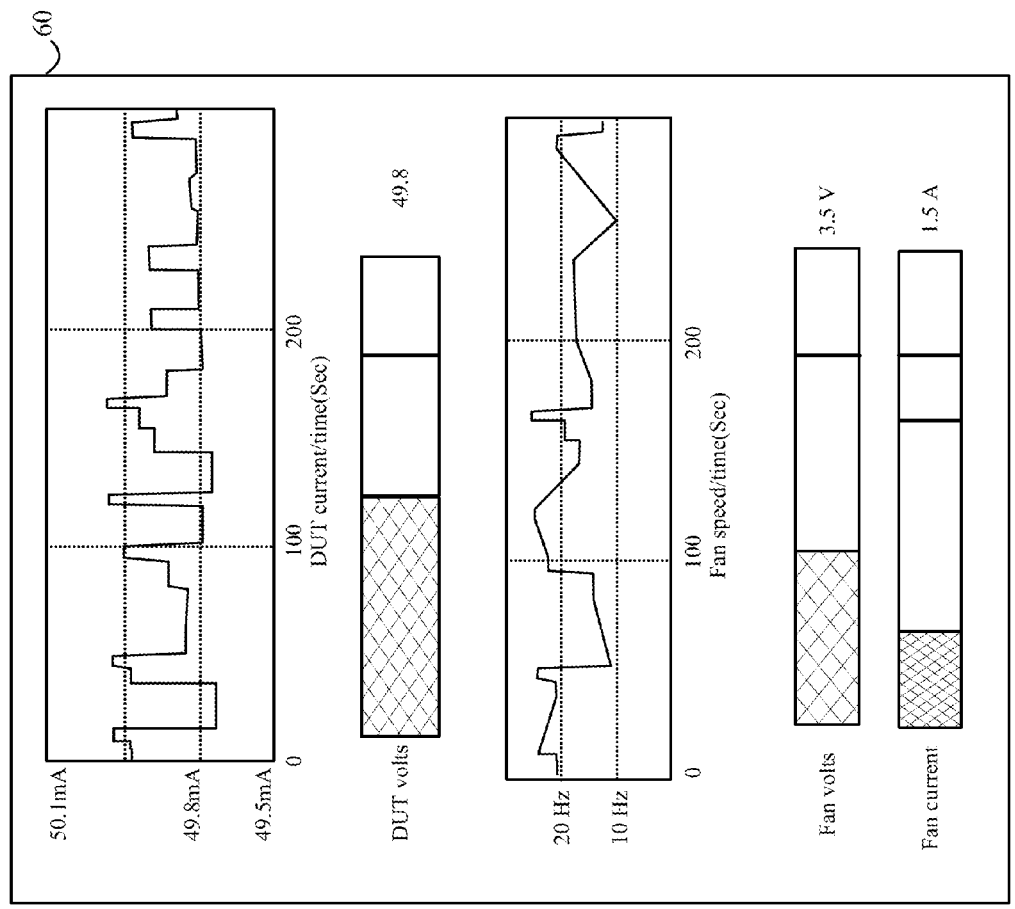
FIG. 3 illustrates a compound GUI created from the GUIs in FIGS. 1 and 2.

In the present invention, the task of providing a GUI for an instrument is significantly simplified by providing a system in which a programmer and conventional programming environment are not required to modify an existing control program or create a new program by combining parts of existing programs. This significantly reduces the work needed to create multiple GUIs for an instrument that are to run on different controlling data processing systems.

Refer now to FIGS. 1 and 2, which illustrate two GUIs that have already been constructed for viewing and/or controlling an instrument. The system being monitored in this example includes a probe that measures the current in a particular component and a probe that measures a voltage output by the system. FIG. 1 illustrates the GUI that monitors the current and output voltage. GUI 40 includes a graphical display component 41 that displays the current as a function of time and a bar graph 42 that shows the present value of the voltage. The system also includes a fan that is characterized by a fan speed, fan voltage, and fan current. FIG. 2, illustrates a separate GUI that monitors the fan properties. In particular, fan GUI 50 includes a graphical display component 51 that displays the fan speed as a function of time and two bar graphs. Bar graph 52 shows the value of the fan voltage at the present time, and bar graph 53 shows the value of the fan current at the present time.

The user of the two GUIs discussed above wishes to construct a third GUI that includes the features of both of these GUIs. In the present invention, the user displays the two GUIs on the same screen and drags the GUI shown in FIG. 2 into the GUI shown in FIG. 1 to create the combined GUI 60 shown in FIG. 3.

To simplify the following discussions, two GUIs that are combined to form a new GUI will be referred to as component GUIs. The GUI that results from combining the two component GUIs will be referred to as a compound GUI. The compound GUI can be a totally new GUI or an augmented version of one of the GUIs, as is the case in the above example.

Each of the GUIs can be viewed as having an interface defining component that is typically written in a language such as XML and a runtime component that includes the various methods used by the components defined in the interface defining component. The runtime system also includes an interpreter that interprets the interface defining component at runtime to provide the data used by the methods to create the GUI and perform the various functions associated with that GUI. The present invention is based on the observation that two component GUIs having this organization can be combined to provide a compound GUI by merging the interface defining components of the component GUIs and including the runtime components of each of the GUIs in the runtime component of the compound GUI.

In one aspect of the invention, the runtime components of the various GUIs are included in a runtime library that services all of the possible GUIs of the applications of interest, and hence, only the interface defining components need to be merged to provide a compound GUI. If, as discussed in more detail below, the two component GUIs are running at the time the component GUIs are combined, the runtime environment will have all of the necessary library routines in memory even if the two GUIs do not share a single runtime library. The two separate runtime libraries can be viewed as a single library that is loaded into memory in two parts.

Typically, a GUI is constructed from a number of individual components. Some of these components have visual representations in the GUI. The components having visual representations will be referred to as widgets in the following discussion. For example, a widget that represents an oscilloscope has a visual representation in the GUI which looks like an oscilloscope screen. Graphical display components 41 and 51 are examples of widgets that provide a display of a quantity as a function of time. Bar graphs 42, 52, and 53 are also examples of widgets.

The underlying control application which generates the GUI may also include components that do not have visual representations in the GUI. For example, an analog-to-digital converter that converts a signal to a digital stream that is processed to provide the input to the oscilloscope widget is not a component that is typically shown in the GUI for the instrument control program, and hence, would not be a widget under this definition.

In the general case, a widget has one or more methods associated with the processing provided by the widget, inputs, outputs, and a GUI display component. The display component determines how the widget is displayed in the GUI. Typically, the display component depends on parameters that are provided in a runtime file that is written in a language such as XML. The entries in this runtime file that determine the appearance and behavior of the widget will be referred to as the runtime widget appearance inputs in the following discussion. The actual location and appearance of the widget is controlled by methods in the runtime library using the runtime widget appearance inputs. An interpreter operates on this file at runtime to provide information to each widget as to where that widget is to display itself in the GUI.

Each of the component GUIs include an interface defining component that contains the display components for the various widgets that make up that GUI. The runtime interface defining component includes the widget appearance inputs and is typically written in a declarative language such as XML. To merge two GUIs, the GUI display defining components of the GUIs must be merged to provide a GUI display defining component for the compound GUI. If the runtime library already includes all of the methods needed to perform the processing in both the component GUIs, the compound GUI will function correctly without altering the runtime library.

To merge the two GUIs, the positions of the various components in at least one of the GUIs must be altered. In addition, the display space available for each GUI may be reduced, since the same display screen area must now accommodate the two GUIs. In one aspect of the invention, the editor that merges the two GUIs allows the user to position the two GUIs relative to one another and define the space available for each GUI. This is the simplest form of merging the two GUIs. As will be explained in more detail below other forms of positioning the widgets in the GUIs can provide more flexibility in the appearance of the compound GUI.

In one embodiment, each component GUI generates a visual display that is treated as a single image. The image is resampled or redrawn at runtime to fit into the available space for that component GUI in the compound GUI. This is the method used to generate GUI 60. While the implementation of this embodiment is relatively straightforward, the results can be less than optimum if the image has a significant amount of blank area, as this area could have been sacrificed to provide more space for the individual widgets in the display. Furthermore, the arrangement of the widgets in the compound GUI are fixed, and hence, cannot be moved relative to one another to provide a more meaningful arrangement.

In another aspect of the invention, the image associated with each widget is altered in response to the available space in the display for that widget. The editor used to move the GUIs also allows the individual widgets within a GUI to be moved in position relative to the other widgets in the GUI. Since the inputs and outputs of the widgets are not altered in the editing process, only the information relating to the position of the widget in the interface defining component of the compound GUI needs to be altered.

In another aspect of the invention, the widgets that make up a GUI do not have fixed sizes for their display components. Instead, each widget adjusts its display component in response to the space that is available to that widget. The available space is defined by a combination of the information in the interface defining component and size of the display screen on which the application is being run. The information on the size of the display screen is provided at runtime and can change during the running of the application for mobile devices that can alter their orientation between portrait and landscape modes. When the orientation changes, the interface defining component is again interpreted to provide new information to the widgets on how the widget is to display itself on the screen. The details of how the widget displays itself are particular to that widget and part of the methods for that widget that are in the runtime library.

Figure 4:
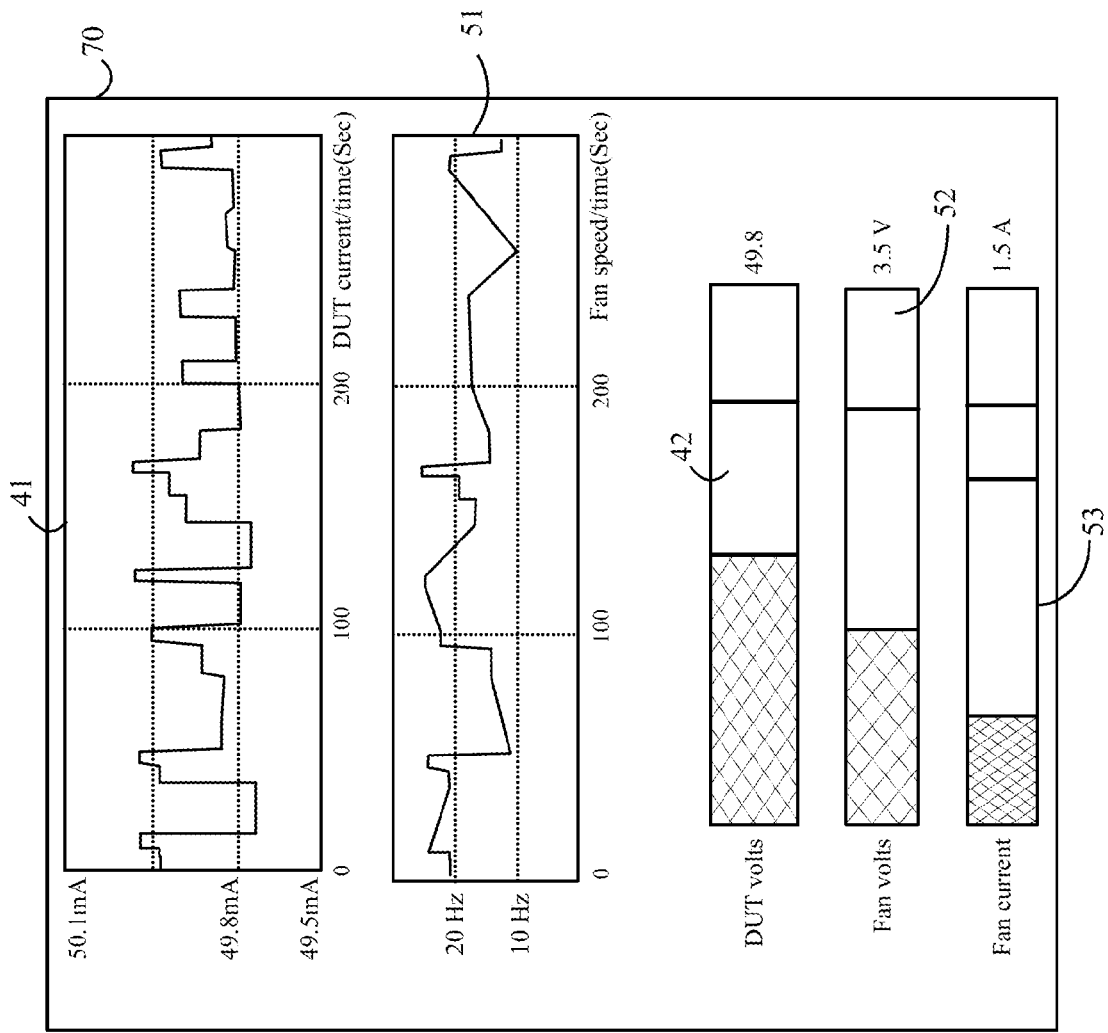
FIG. 4 illustrates the compound GUI shown in FIG. 3 after various elements have been rearranged and resized.

Refer now to FIG. 4, which illustrates the compound GUI shown in FIG. 3 after the positions of the various widgets have been altered and the sizes adjusted to provide a more efficient display. In particular, the two graphic widgets that show signals as a function of time have been grouped together, and the bar graphs have also been grouped together. In addition the label widgets that define various text entries have been moved and the font size adjusted to be more readable than the case in which the entire component GUI widgets were merely resampled or redrawn to a smaller size.

In one aspect of the invention, the runtime interpreter and library functions that communicate the size of the display provide the widgets with the space available for each widget. The widget then provides its display image for incorporation into the GUI. For example, a widget may scale its display to fill space provided to that widget at runtime by resampling or redrawing the image for that widget at runtime as discussed above. The resampling or redrawing approach works well provided the available space is greater than some predetermined space. However, if the available space becomes too small, the resulting image is difficult for a user to interpret.

Figure 5A:
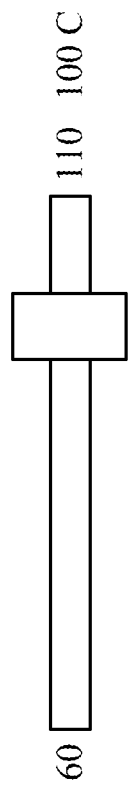
FIGS. 5A-5C illustrate a graphical element that changes form when the available display area becomes overly restrictive for the first form.
Figure 5B:
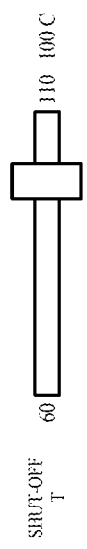
Figure 5C:

In another aspect of the invention, the widget generates an abbreviated display that preserves the useful data provided by the display if the available space is less than the predetermined minimum. Refer now to FIGS. 5A-5C, which illustrate a slider widget that changes display style when the available space becomes too small to merely resample or redraw its image to the smaller size and still have a readable widget image. FIG. 5A illustrates the widget image of the slider widget when sufficient space is available to view the widget image. In particular, the widget image consists of a label "shut-off T", the slider image 81 for setting the shut-off temperature, the minimum and maximum temperature labels, and the current value of the shut-off temperature, i.e., 100 C. FIG. 5B shows the widget image when the image is merely resampled or redrawn to provide a smaller image for display in a more restricted space. In this case, the text becomes too small to read and the slider itself becomes too small to operate with a touch gesture on the screen. FIG. 5C illustrates the alternative slider widget image for use when the display space is too restrictive to use the image shown in FIG. 5A. The alternative widget image shows a box with the quantity controlled by the slider and the current value. To alter the value, the user selects the box and types in a new value using a pop-up keyboard.

Hence, when the new GUI must operate in a reduced space because two or more component GUIs are being combined, the available space is provided to each widget, which in turn, generates the appropriate sized display without the need for the user to adjust the displays. This aspect of the present invention also allows the same GUI to run on different devices having different display areas and orientations without requiring a separate GUI display component to be provided for each display possibility.

As noted above, the interface defining component for the compound GUI is interpreted at runtime. Hence, the actual combining of the component GUI defining components can be carried out at any time without requiring a recompilation of the underlying code provided an appropriate editor is available. In fact, the combining of the GUIs can be carried out while the GUIs are running, since the inputs and outputs of a GUI are moved with the GUI. After the new interface defining component has been generated, the editor can also save that file to provide a new GUI that will operate without the presence of the editor.

The ability to combine GUIs during runtime allows a user who is viewing a DUT in a first GUI to quickly generate a more complex GUI to explore the DUT in view of the information in the first GUI. The user merely starts one or more GUIs that provide additional information and drags the components into a compound GUI that brings all of the information of interest together in a single GUI. It should be noted that the user can drag individual components from a second GUI into the first GUI or the user can drag the entire second GUI into the first GUI. In addition, the user can delete one or more components from the combined GUI.

As noted above, the ability of the widgets to automatically resize their display images significantly simplifies the task of combining the GUI descriptive files. In one aspect of the present invention, the GUI is defined in terms of a special "widget" that specifies the order of each widget within the GUI. One such special widget is referred to as a VPanel, which specifies a vertically organized array of widgets in a GUI. All widgets within a VPanel are organized in the order specified in the VPanel specification in the GUI descriptive file. In addition, the methods for a VPanel automatically divide the space available for the widgets and communicate that allocation to the widget methods that define the display for each widget. The order of the widgets within the VPanel are the same as the order in which the widgets appear in the VPanel declaration. Since the methods automatically allocate the space and position of the widgets, the GUI descriptive file for the GUI is significantly simplified. As a result, the editing task of combining and reordering widgets within the compound GUI is significantly simplified as well. A similar special widget can be defined for automatically organizing a plurality of widgets in a horizontal fashion with an order determined by the order in the declaration.

For example, the GUI descriptive files for the GUIs shown in the above described figures are as follows:

---

FIG. 1

```
<VPanel>
    <Trace value="{Remote currentTrace}"/>
    <Label text="DUT current/time(Sec)"/>
    <Meter value="{Remote dutVoltage}" label="DUT volts" units="V"/>
</VPanel>
```

---

FIG. 2

```
<VPanel>
    <Trace value="{Remote fanSpeedTrace}"/>
    <Label text="Fan speed/time(Sec)"/>
    <Meter value="{Remote fanVoltage}" label="Fan volts" units="V"/>
    <Meter value="{Remote fanCurrent}" label="Fan current" units="A"/>
</VPanel>
```

---

FIG. 3

```
<VPanel>
    <Trace value="{Remote currentTrace}"/>
    <Label text="DUT current/time(Sec)"/>
    <Meter value="{Remote dutVoltage}" label="DUT volts" units="V"/>
    <Trace value="{Remote fanSpeedTrace}"/>
    <Label text="Fan speed/time(Sec)"/>
    <Meter value="{Remote fanVoltage}" label="Fan volts" units="V"/>
    <Meter value="{Remote fanCurrent}" label="Fan current"
```

-continued

FIG. 3

```
units="A"/>
    </VPanel>
```

FIG. 4

```
<VPanel>
    <Trace value="{Remote currentTrace}"/>
    <Label text="DUT current/time(Sec)"/>
    <Trace value="{Remote fanSpeedTrace}"/>
    <Label text="Fan speed/time(Sec)"/>
    <Meter value="{Remote dutVoltage}" label="DUT volts"
        units="V"/>
    <Meter value="{Remote fanVoltage}" label="Fan volts"
        units="V"/>
    <Meter value="{Remote fanCurrent}" label="Fan current"
        units="A"/>
</VPanel>
```

It should be noted that the interpreter that interprets the GUI descriptive files can be resident on the data processing system that is being viewed by the user or on a remote data processor that is connected to or part of the instrument. For example, the user could be accessing the GUIs via a viewer that is analogous to a web browser. The actual descriptive files, editors, and runtime library are then located on the server that is communicating with the viewer.

Some of the above-described embodiments require that the components of one of the GUIs must be re-sized when the new GUI is created by combining the two existing GUIs. In one aspect of the present invention, each GUI is constructed from components that automatically resize themselves to fit the available space. In this system, each GUI includes a layout description and a runtime system that generates the GUI in response to the layout description and the available space. The layout description is written in some declarative language as discussed above. The layout description is organized as one or more containers. A container has one or more child components within the container. A container can have children that are also containers. The container has a defined space associated with that container. The outer most container has a space determined by the display geometry and the runtime system. The runtime system automatically divides the container space into a plurality of component spaces, and adjusts the display of the corresponding child component to fill the assigned component space. This aspect of the present invention is described in detail in co-pending patent application Ser. No. 13/838,087, which is hereby incorporated in its entirety.

The VPanel component discussed above is an example of such a container. The space assigned by the runtime system to that container is divided equally between the child components, e.g., meter, trace, etc., unless specified differently. When two GUIs are combined, the layout descriptions of those GUIs are merged by the editor. For example, the editor can define a larger container and then include each of the component GUIs as children of that container. Each component GUI now has a reduced space in which to display itself. The runtime system automatically resizes the components of that GUI to fill the new space. Hence, the user does not need to individually deal with the task of resizing the components to fit the components into the more restricted space.

Since the GUIs, including the new combined GUI, have corresponding layout files that are written in descriptive language that can be edited, the user can also edit the new layout file to adjust the sizes if the user is not satisfied by the space allocations that have been provided. In one aspect of the present invention, the runtime system provides the user with a descriptive file that can be edited either online or offline.

The present invention also includes computer readable storage media that store computer instructions that cause a data processing system to execute the method of the present invention when those instructions are read by the data processing system. Computer readable storage media is defined as any computer readable storage medium that constitutes patentable subject matter under 35 U.S.C. 101. Such storage media include non-transitory storage media such as computer non-volatile computer memories and storage media.

The above-described embodiments of the present invention have been provided to illustrate various aspects of the invention. However, it is to be understood that different aspects of the present invention that are shown in different specific embodiments can be combined to provide other embodiments of the present invention. In addition, various modifications to the present invention will become apparent from the foregoing description and accompanying drawings. Accordingly, the present invention is to be limited solely by the scope of the following claims.

What is claimed is:

1. A method of operating a data processing system comprising a control screen to provide control of a program, said method comprising:
    providing a first program graphical user interface (GUI) with a display on said control screen, said first program GUI comprising a first GUI description and a first method for operating on data input to or data output from that said first program GUI;
    providing a second program GUI with a display on said control screen, said second program GUI comprising a second GUI description and a second method for operating on data input to or data output from that said second program GUI;
    providing a runtime library having said first and second methods; and
    causing said data processing system to combine said first GUI description and said second GUI description to provide a compound GUI with a display on said control screen without recompiling said runtime library, wherein said first GUI is displayed by a first program and said second GUI is displayed by a second program, said first GUI description and said second GUI description being combined while programs operating said GUIs are operating.

2. The method of claim 1 wherein said first GUI has signal inputs from a source external to said data processing system and said compound GUI includes said signal inputs.

3. The method of claim 1 wherein said first GUI has first GUI outputs and wherein said compound GUI includes said first GUI outputs.

4. The method of claim 1 wherein causing said data processing system to combine said first GUI description and said second GUI description comprises
    displaying said first GUI and said second GUI, said first GUI comprising a plurality of widgets; and
    selecting one of said widgets from said first GUI and dragging said selected one of said widgets from said first GUI to said second GUI in response to input from a user of said data processing system thereby causing said one of said widgets to be moved into said second GUI while said programs operating said first and second GUIs are operating.

5. The method of claim 4 wherein all of said first GUI is moved into said second GUI in response to input from a user of said data processing system.

6. The method of claim 1 further comprising deleting a component from said compound GUI in response to input from a user of said data processing system.

7. The method of claim 1 wherein said second GUI occupies a first area on said control screen and wherein said data processing system automatically resizes said first GUI such that said first GUI and second GUI occupy said first area.

8. The method of claim 1 wherein said first GUI comprises a widget characterized by a widget display area and wherein said data processing system automatically resizes said widget display area in response to said combining of said first GUI description and said second GUI description.

9. The method of claim 1 wherein said first GUI description comprises a declarative language file describing a visual layout of said first GUI.

10. A non-transitory computer readable medium comprising instructions that cause a data processing system having a control screen to execute a method for operating said data processing system, said method comprising:
providing a first program GUI comprising a first GUI with a display on said control screen, said first program GUI comprising a first GUI description and a first method for operating on data input to or data output from that said first program GUI;
providing a second program GUI with a display on said control screen, said second program GUI comprising a second GUI description and a second method for operating on data input to or data output from that said second program GUI;
providing a runtime library having said first and second methods; and
causing said data processing system to combine said first GUI description and said second GUI description to provide a compound GUI with a display on said control screen without recompiling said runtime library, wherein said first GUI is displayed by a first program and said second GUI is displayed by a second program, said first GUI description and said second GUI description being combined while programs operating said GUIs are operating.

11. The non-transitory computer readable medium of claim 10 wherein said first GUI has signal inputs from a source external to said data processing system and said compound GUI includes said signal inputs.

12. The non-transitory computer readable medium of claim 10 wherein said first GUI has first GUI outputs and said compound GUI includes said first GUI outputs.

13. The non-transitory computer readable medium of claim 10 wherein causing said data processing system to combine said first GUI description and said second GUI description comprises displaying said first GUI and said second GUI, said first GUI comprising a plurality of widgets; and selecting one of said widgets from said first GUI and dragging in response to input from a user of said data processing system and causing said one of said widgets to be moved into said second GUI.

14. The non-transitory computer readable medium of claim 13 wherein all of said first GUI is moved into said second GUI in response to input from a user of said data processing system while said programs operating said first and second GUIs are operating.

15. The non-transitory computer readable medium of claim 10 further comprising deleting a component from said compound GUI in response to input from a user of said data processing system.

16. The non-transitory computer readable medium of claim 10 wherein said second GUI occupies a first area on said control screen and wherein said data processing system automatically resizes said first GUI such that said first GUI and second GUI occupy said first area.

17. The non-transitory computer readable medium of claim 10 wherein said first GUI comprises a widget characterized by a widget display area and wherein said data processing system automatically resizes said widget display area in response to said combining of said first GUI description and said second GUI description.

18. The non-transitory computer readable medium of claim 10 wherein said first GUI description comprises a declarative language file describing a visual layout of said first GUI.

\* \* \* \* \*